United States Patent
Vanmoor

(10) Patent No.: US 6,749,401 B2
(45) Date of Patent: Jun. 15, 2004

(54) HYDRODYNAMICALLY AND AERODYNAMICALLY OPTIMIZED LEADING EDGE STRUCTURE FOR PROPELLERS, WINGS, AND AIRFOILS

(76) Inventor: Arthur Vanmoor, 22 SE. 4 St., P.B.M. 219, Boca Raton, FL (US) 33432

( * ) Notice: Subject to any disclaimer, the term of this patent is extended or adjusted under 35 U.S.C. 154(b) by 0 days.

(21) Appl. No.: 10/208,565

(22) Filed: Jul. 30, 2002

(65) Prior Publication Data

US 2004/0022635 A1 Feb. 5, 2004

(51) Int. Cl.$^7$ .............................................. F04D 29/38
(52) U.S. Cl. .................. 416/228; 416/243; 416/DIG. 2; 416/242; 244/45 R
(58) Field of Search ................................ 416/228, 242, 416/243, DIG. 2; 244/45 R

(56) References Cited

U.S. PATENT DOCUMENTS

| | | | |
|---|---|---|---|
| 1,049,571 A | * | 1/1913 | Freeman ..................... 416/194 |
| 1,613,091 A | * | 1/1927 | Francis ..................... 244/45 R |
| 1,895,252 A | * | 1/1933 | Kontos ....................... 416/242 |
| 3,392,936 A | * | 7/1968 | Wornom ...................... 244/13 |
| 6,095,457 A | | 8/2000 | Vanmoor |
| 6,164,919 A | | 12/2000 | Vanmoor |
| 6,168,384 B1 | | 1/2001 | Vanmoor |

FOREIGN PATENT DOCUMENTS

DE          3835213 A1  *  5/1990

\* cited by examiner

*Primary Examiner*—Ninh H. Nguyen
(74) *Attorney, Agent, or Firm*—Laurence A. Greenberg; Werner H. Stemer; Ralph E. Locher

(57) ABSTRACT

A novel concept for a propeller blade configuration incorporates the model of the natural wave behavior. The leading edge of the propeller blade has a convex segment followed by a concave segment, as seen in a plan view. The leading and trailing edges are rounded so as to promote proper fluid sheet formation along the flat surfaces and to reduce undesirable vortice formation. Best results are obtained by modeling the surfaces along a sine or tangent function.

21 Claims, 2 Drawing Sheets

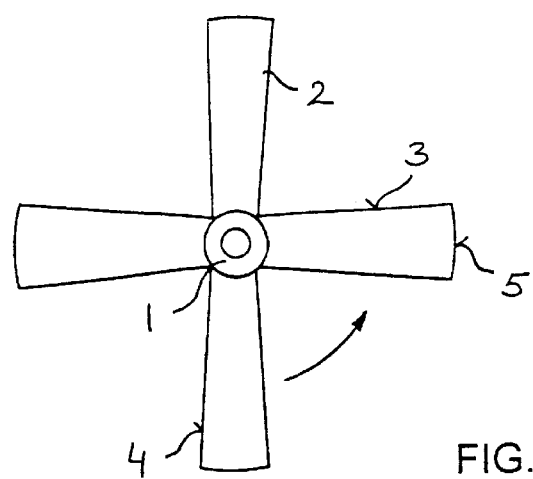
FIG. 1
PRIOR ART
FIG. 2
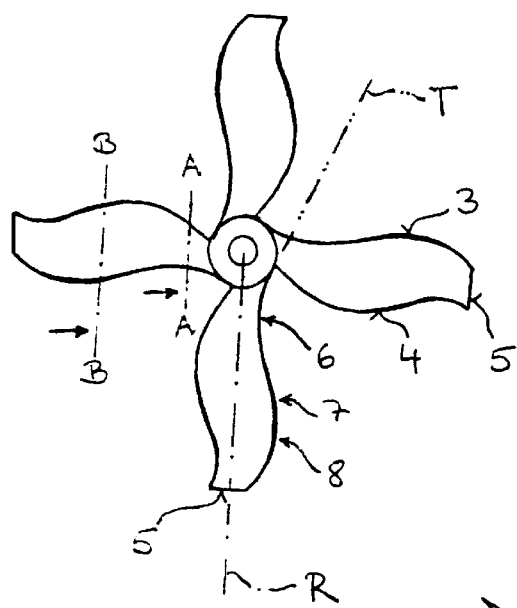
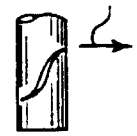
FIG. 2A
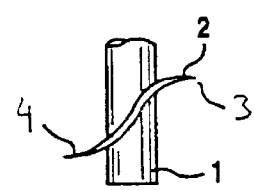
FIG. 2B
FIG. 2C
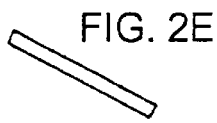
FIG. 2E
FIG. 2F
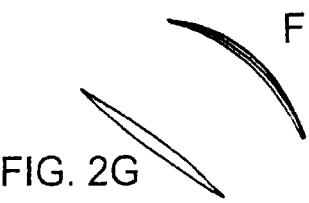
FIG. 2D
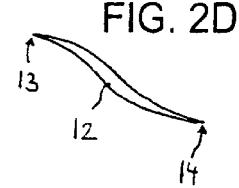
FIG. 2G

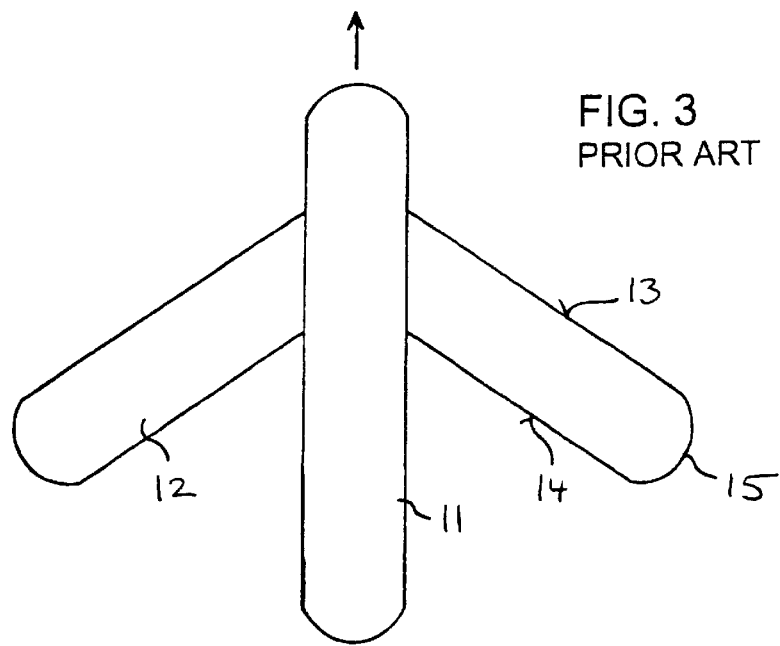
FIG. 3
PRIOR ART
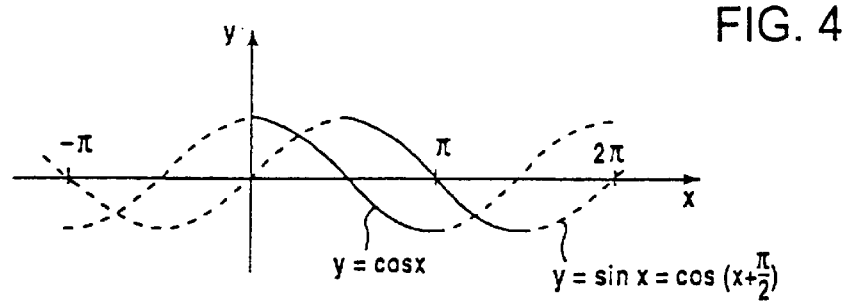
FIG. 4
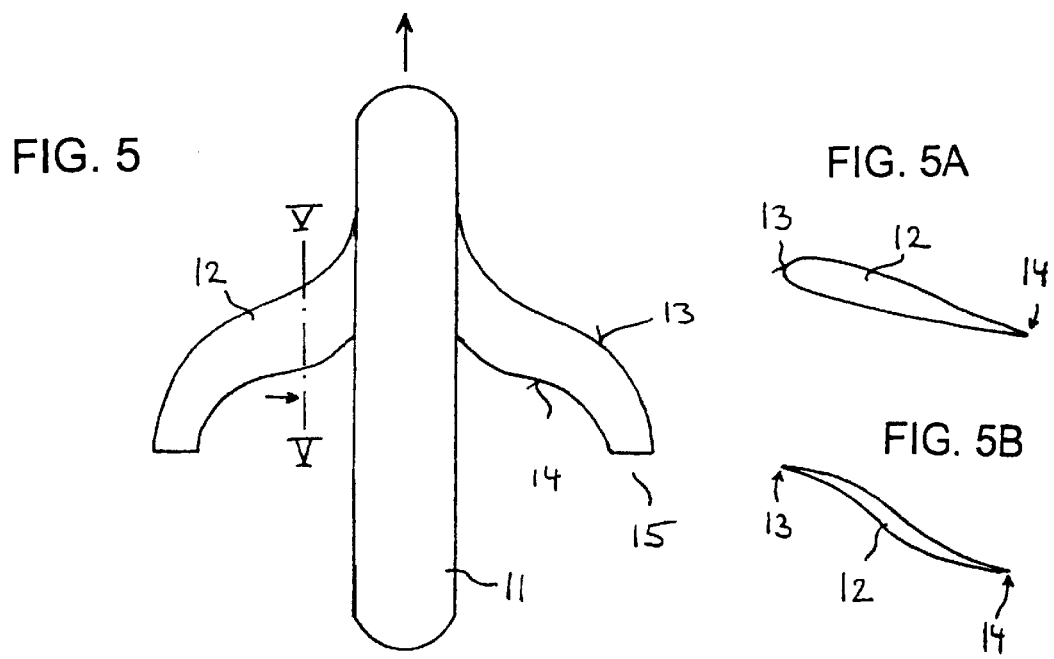
FIG. 5
FIG. 5A
FIG. 5B

HYDRODYNAMICALLY AND AERODYNAMICALLY OPTIMIZED LEADING EDGE STRUCTURE FOR PROPELLERS, WINGS, AND AIRFOILS

BACKGROUND OF THE INVENTION

Field of the Invention

The invention lies in the field of fluid dynamics. In particular, the invention pertains to dynamically optimized leading edge structures for various applications such as watercraft propulsion propellers, stationary fluid propellers, aircraft propellers, and aircraft wings.

In a series of earlier patents, including U.S. Pat. Nos. 6,164,919; 6,168,384; and 6,095,457, I presented a novel concept for propeller blade configurations and airfoil and wing configurations. The concept provided for the surfaces of propellers and the like that had previously been rounded along a slight curve in one direction, to be shaped along a tangent or a sine function. That is, a propeller cross-section at any line substantially perpendicular to a longitudinal axis of the configuration would show a double-curved shape which can be best described with a sine function and/or a tangent function. The leading edges of those structures were of no concern to me at that time.

The earlier disclosures of U.S. Pat. Nos. 6,164,919; 6,168,384; and 6,095,457 are hereby incorporated by reference.

While my earlier patents provide considerable advantages in a variety of speed ranges, additional improvements—even those improvements that are apparently very minor—may lead to further efficiency increases. Especially in light of the dwindling supplies or non-renewable energy resources, any increase in efficiency, of course, is beneficial.

SUMMARY OF THE INVENTION

It is accordingly an object of the invention to provide a novel, dynamically optimized, leading edge structure, which further minimizes the above-mentioned disadvantages of the heretofore-known devices of this general type and which proposes a novel principle in leading edge structure design that further decreases the hydrodynamic and aerodynamic drag of such structures. Improvements are measurable, by way of example, in a further improved thrust-to-drag ratio of propeller blades and the corresponding efficiency of propulsion propellers and stationary pump propellers.

With the foregoing and other objects in view there is provided, in accordance with the invention, a propeller configuration, comprising:

a rotatable hub defining an axis of rotation;

at least two blade structures attached to the hub substantially perpendicular to the axis of rotation;

each of the blade structures having a leading edge, a trailing edge, a forward surface extending from the leading edge to the trailing edge, and a rear surface extending from the leading edge to the trailing edge;

the leading edge extending from the hub outwardly along a line being describable with a continuously positive slope and a reversing second derivative, or a first rounding concave rounding and a second convex rounding.

In other words, the leading edge of each of the blade structures follows a curve having a concave segment and an adjoining convex segment, or a segment that is concave up followed by a segment that is concave down.

In accordance with an added feature of the invention, the curve of the leading edge starts from the hub substantially along a tangent line, curves along the concave segment, and merges into the convex segment leading to the periphery.

In accordance with an additional feature of the invention, the trailing edge of each of the blade structures follows a curve having a concave segment and an adjoining convex segment.

In accordance with another feature of the invention, the curve of the trailing edge starts from the hub substantially radially outward, curves along the convex segment, and merges into the concave segment leading to the periphery.

In accordance with a further feature of the invention, relative to a center line of the respective blade, the curve of the leading edge is defined by a function $y = a \sin x$, where $-\pi/2 \leq x < \pi$ in radians, a being a real number defining an amplitude of the curve of the leading edge.

In accordance with again an added feature of the invention, each of the blade structures is formed with a forward surface extending from the leading edge to the trailing edge, and a rear surface extending from the leading edge to the trailing edge;

the forward surface and the rear surface at the leading edge extending substantially parallel to and offset from the forward surface and the rear surface at the trailing edge, and converging smoothly at the trailing and leading edges to form a sharp leading edge and a sharp trailing edge.

In accordance with again an additional feature of the invention, the forward surface and the rear surface are defined by a function $y = a \cos x$, where $0 \leq x \leq \pi$ in radians, x being approximately equal to zero at the leading edge and x being approximately equal to $\pi$ at the trailing edge, and a being a real number defining a given thickness of the blade structures.

In accordance with again another feature of the invention, the leading edge and the trailing edge are defined by a tangent function. Preferably, the width of the blade structures defined between the leading edge and the trailing edge varies with a distance from the hub, with a relatively narrower segment at the hub merging into a relatively wider segment distally from the hub.

With the above and other objects in view there is also provided, in accordance with the invention, a wing configuration for a fixed-wing aircraft. The wing configuration comprises:

a wing structure attached to a fuselage of the aircraft and projecting sideways away from the fuselage;

the wing structure having a leading edge defined by a forward traveling direction of the aircraft, a trailing edge, and a free end distally from the fuselage, the leading edge of the wing structure following a curve having a concave segment and an adjoining convex segment.

Similarly to the above-summarized propeller blade, the curve of the leading edge starts from the fuselage substantially colinear with a sidewall of the fuselage, curves along the concave segment, and merges into the convex segment leading to the free end.

In accordance with yet an added feature of the invention, the trailing edge of the wing structure follows a curve having a concave segment and an adjoining convex segment.

In accordance with yet an additional feature of the invention, as defined relative to a center line of the wing structure, the curve of the leading edge is defined by a function $y = a \sin x$, where $-\pi/2 \leq x \leq \pi/2$ in radians, a being a real number defining an amplitude of the curve of the leading edge.

In accordance with a concomitant feature of the invention, the leading edge and the trailing edge are substantially defined by a tangent function.

The term propeller, herein, refers to propulsion propellers and impellers, such as for water propellers and for aircraft propellers (propulsion props, turbine blades, helicopter blades), as well as to stationary propellers and impellers used in high-power fans (wind tunnels, high velocity fluid pumps) and stationary turbines.

The term wing pertains to fixed wings and airfoils for fixed wing aircraft as well as gliders and glider wings for helicopters and the like.

In summary, I have now found that certain additional dynamic advantages over the prior art can be gained from variations in the leading edges and trailing edges of fluidically exposed structures.

Other features which are considered as characteristic for the invention are set forth in the appended claims.

Although the invention is illustrated and described herein as embodied in dynamically optimized leading edge structures, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 1 is a plan axial view of a prior art four-blade propeller;

FIG. 2 is a plan view of a propeller blade according to the invention;

FIG. 2A is a section taken along the line A—A in FIG. 2, and viewed in a direction towards the center hub;

FIG. 2B is a section taken along the line B—B in FIG. 2, and viewed in a direction towards the center hub;

FIGS. 2C–2G are sectional views taken along the line B—B in FIG. 2 illustrating alternative embodiments of the propeller blades;

FIG. 3 is a highly schematic top plan view onto a fixed-wing aircraft according to the prior art;

FIG. 4 is a plot of a sine and cosine function as applied to the invention;

FIG. 5 is a highly schematic top plan view onto a fixed-wing aircraft with airfoils having the leading edge structure and the trailing edge structure according to the invention;

FIG. 5A is a diagrammatic section taken through the left-hand wing/airfoil of FIG. 5 along the line V—V; and FIG. 5B is a diagrammatic section taken through the left-hand wing/airfoil of FIG. 5 along the line V—V in an alternative embodiment.

DESCRIPTION OF THE PREFERRED EMBODIMENTS

Referring now to the figures of the drawing in detail and first, particularly, to FIG. 1 thereof, there is seen a simplified prior art blade configuration. The exemplary propeller may be a marine propeller or a fan propeller. A central hub 1 has four blades 2 radially and equal angular spacings projecting from the hub 1. The propeller has a primary rotation in a direction of the arrow shown in the lower right quadrant. Each of the four blades 2 has a substantially straight leading edge 3 and a similarly straight trailing edge 4. It is also known from the prior art to round the leading and trailing edges 3 and 4 with regard to the straight radius. Typically, the blades 2 would have a concave edge extending from the hub 1 to an outer peripheral edge 5, and then along a concave edge back to the hub 1.

Before delving into the description of the inventive features, certain definitional boundaries must be set. The following description will refer to sine and cosine functions, to tangent functions, to first derivatives and second derivatives. These expressions only aid in the elucidation of the invention, but they should not be understood in a strict mathematical sense. For instance, for the purpose of the derivatives, it must be presumed that the underlying function is a differentiable function within the interval of interest. Further, it must be presumed that the function is continuous in the interval. In fact, however, the function, if accurately defined, may neither be differentiable nor continuous. Yet, the terms slope, points of inflection, and the second derivative will nevertheless by used, as they aid in the description of the invention.

Referring now specifically to FIG. 2, the propeller blade according to the invention has a leading edge 3, and optionally a trailing edge 4, that may be modeled as a sinusoidal curve shape or a tangent function. The leading edge 3 and the trailing edge 4 of the novel blade as illustrated very nearly follow a tangent function (here, arctan, as viewed) from the hub to the periphery 5. At the periphery of the hub 1, the leading edge 3 starts in the direction of a tangent line T. Then the leading edge 3 curves outwardly in a concave shape until it is parallel to a radius R at a point 6. Here, the radius R is defined as a straight line from the radial center of the hub 1 along the approximate center of the blade 2. The center of the blade can be found by defining the area of the blade 2 (as seen in the illustrated plan view) and then assigning one half of the area from the radius R to the leading edge 3 and one half of the area from the radius R to the trailing edge 4.

From the point 6, the leading edge 3 curves away from the radius R towards a point 7, where the second derivative goes through its zero point (i.e., the second derivative changes from positive to negative). At a point 8, the leading edge 3 is once again parallel to the radius R, before it slopes back along the convex shape towards the radius R. As drawn in FIG. 2, the radius R, the periphery 5, and the leading edge 3 all overlap at one point.

In terms of the first derivative, the curve describing the leading edge 3 thus changes the sign of its slope at least once. If, for instance, the radius R is seen as the cartesian x axis, the leading edge 3 has a negative slope from the hub to the point 6, a positive slope to the point 8, and a negative slope from the point 8 to its end point. In terms of the second derivative, the curve changes sign once, namely, at the point 7, where the second derivative goes through its zero point. The point 7, therefore is a point of inflection. The novel leading edge structure is defined as having at least one inflection point. That is, depending on the application and the fluid-dynamic behavior of the given blade structure, the leading edge may also be formed with more than one inflection point.

The trailing edge 4 follows a similar curve. The first derivate goes through two changes, i.e., the curve changes the slope sign twice (if viewed relative to the line R as the cartesian x axis). The second derivative has a single zero point, it is positive from the hub outwardly and then negative from the zero point to the periphery, or vice versa. At the trailing edge 4, the blade meets the hub 1 approximately perpendicularly, i.e., approximately parallel to a radial line.

FIGS. 2A and 2B illustrate two sections through the blade 2 along the line A—A and B—B, respectively. The cross-sectional shape of the blades forms the subject of my earlier disclosure in U.S. Pat. No. 6,164,919 (incorporated by reference) and will not be discussed in detail. Suffice it to say that the sectional curvature of the blades may be defined with a simple sine function with a amplitude coefficient that is smaller than 1.

FIGS. 2C to 2C show various alternative embodiments of the blade shape. These represent sections taken along the line B and/or the line A.

It will be understood that, while four blades are illustrated in FIG. 2, the novel concept is applicable to other multi-blade systems as well. Three and four blade propellers are the most typical. Impellers often utilize additional blades. A two blade propeller is equally possible. Reference is had, in this context, to my earlier U.S. Pat. No. 6,168,384. The propeller blades illustrated therein are relatively easily adapted to the novel leading edge and, optionally, trailing edge shapes.

Referring now to FIGS. 3–5, the invention detailed herein also relates to fixed-wing aircraft. As indicated in FIG. 3, a wing 12 projects away from a fuselage 11 at a given angle relative to the longitudinal axis of the fuselage. Typically, the air-foils or wings 12 project obliquely backwards. The wings 12 are illustrated with a fixed width. A multitude of variations are known in the art. Specifically, most wings of commercial and military aircraft are, in fact, wider near the fuselage and then taper towards their free ends 15. The leading edge 13 and the trailing edge 14 of the prior art follow a generally straight line, with possible slight roundings at the fuselage and/or at the free ends 15.

With reference to FIGS. 4 and 5, the leading edge 13 of the structure according to the invention follows a curve that may be described as a sine function, or as a tangent function. The leading edge 13 on the right-hand wing 12 would correspond to the sine function y=sin x from $-\pi/2$ to $+\pi/2$ and to y=cos x from $\pi$ to $2\pi$. The leading edge of the left-hand wing 12 may be modeled with a $\pi$ offset relative to the right-hand wing 12. That is y=sin x from $\pi/2$ to $3\pi/2$ and y=cos x from 0 to $\pi$. I goes without saying that these modeling curves are rather approximate and they are subject to a wide range of variations. For example, the amplitudes of the functions must be necessarily varied such that y=a sin x. Here, a is either a constant or a further function (which may be defined by the distance from the fuselage). Further, the modeling curves are only approximate because the functions may be neither continuous nor differentiable. Most importantly, however, with reference to at least one straight line (e.g., the center axis of the wing), the slope changes at least once from upwardly concave to convex (i.e., downwardly concave). A generalized description of the leading and trailing edges of the wing 12 may be found above with reference to the leading and trailing edge structures of the propeller blade 2 in FIG. 2.

The wings of the aircraft in FIG. 5 may be formed in a variety of ways, such as, for instance, as a conventional airfoil structure or a double-curved wing as disclosed in my earlier U.S. Pat. No. 6,095,457. The regular airfoil structure is illustrated in FIG. 5A. The double-curved wing is illustrated in FIG. 5B and described in detail in my earlier patent.

I claim:
1. A propeller configuration, comprising:
a rotatable hub defining an axis of rotation;
a plurality of blade structures attached to said hub and projecting radially away from said axis of rotation;
each of said blade structures having a leading edge, a trailing edge, and a periphery distally from said hub, said leading edge of each of said blade structures following a curve modeled along a sine function starting from said hub substantially along a tangent line and having at least one curved segment selected from the group consisting of a concave segment and a convex segment.
2. The propeller configuration according to claim 1, wherein said sine function extends along an interval of more than $\frac{1}{2}\cdot\pi$ in radians.
3. The propeller configuration according to claim 2, wherein said sine function extends along an interval of approximately $\pi$ in radians.
4. The propeller configuration according to claim 1, wherein said trailing edge of each of said blade structures follows a curve having a concave segment and an adjoining convex segment.
5. The propeller configuration according to claim 4, wherein said curve of said trailing edge starts from said hub substantially radially outward, curves along said convex segment, and merges into said concave segment leading to said periphery.
6. The propeller configuration according to claim 1, wherein said leading edge and said trailing edge are defined by a tangent function.
7. The propeller configuration according to claim 1, wherein a width of said blade structures defined by said leading edge and said trailing edge varies with a distance from said hub, with a relatively narrower segment at said hub merging into a relatively wider segment distally from said hub.
8. A propeller configuration, comprising:
a rotatable hub defining an axis of rotation;
a plurality of blade structures attached to said hub and projecting radially away from said axis of rotation;
each of said blade structures having a leading edge, a trailing edge, and a periphery distally from said hub, said leading edge of each of said blade structures following a curve modeled along a sine function and having at least one curved segment selected from the group consisting of a concave segment and a convex segment, and wherein, relative to a center line of each of said blades, said curve of said leading edge is defined by a function y=a sin x, where $-\pi/2 \leq x < \pi$ in radians, a being a real number defining an amplitude of said curve or said leading edge.
9. A propeller configuration, comprising:
a rotatable hub defining an axis of rotation;
a plurality of blade structures attached to said hub and projecting radially away from said axis of rotation;
each of said blade structures having a leading edge, a trailing edge, and a periphery distally from said hub, said leading edge of each of said blade structures following a curve modeled along a sine function and having at least one curved segment selected from the group consisting of a concave segment and a convex segment, and
wherein each of said blade structures is formed with a forward surface extending from said leading edge to said trailing edge, and a rear surface extending from said leading edge to said trailing edge;

said forward surface and said rear surface at said leading edge extending substantially parallel to and offset from said forward surface and said rear surface at said trailing edge, and converging smoothly at said trailing and leading edges to form a sharp leading edge and a sharp trailing edge.

10. The propeller configuration according to claim 9, wherein said forward surface and said rear surface are defined by a function y=a cos x, where $0 \leq x \leq \pi$ in radians, x being approximately equal to zero at said leading edge and x being approximately equal to $\pi$ at said trailing edge, and a being a real number defining a given thickness of said blade structures.

11. A propeller configuration, comprising:

a rotatable hub defining an axis of rotation;

a plurality of blade structures attached to said hub and projecting radially away from said axis of rotation;

each of said blade structures having a leading edge, a trailing edge, and a periphery distally from said hub, said leading edge of each of said blade structures following a curve starting from said hub substantially along a tangent line and having a concave segment and an adjoining convex segment.

12. The propeller configuration according to claim 11, wherein said curve of said leading edge starts from said hub substantially along a tangent line, curves along said concave segment, and merges into said convex segment leading to said periphery.

13. The propeller configuration according to claim 11, wherein said trailing edge of each of said blade structures follows a curve having a concave segment and an adjoining convex segment.

14. The propeller configuration according to claim 13, wherein said curve of said trailing edge starts from said hub substantially radially outward, curves along said convex segment, and merges into said concave segment leading to said periphery.

15. A propeller configuration, comprising:

a rotatable hub defining an axis of rotation;

a plurality of blade structures attached to said hub and projecting radially away from said axis of rotation;

each of said blade structures having a leading edge, a trailing edge, and a periphery distally from said hub, said leading edge of each of said blade structures following a curve modeled along a sine function and having at least one curved segment selected from the group consisting of a concave segment and a convex segment; and wherein, relative to a center line of each of said blades, said curve of said leading edge is defined by a function y=a sin x, where $-\pi/2 \leq x < \pi$ in radians, a being a real number defining an amplitude of said curve of said leading edge.

16. In a fixed-wing aircraft having a fuselage with a longitudinal axis, a wing configuration attached to the fuselage, comprising:

a wing structure attached to the fuselage and projecting sideways away from the fuselage;

said wing structure having a leading edge defined by a forward traveling direction of the aircraft, a trailing edge, and a free end distally from the fuselage, said leading edge of said wing structure following a curve having a concave segment and an adjoining convex segment, and, relative to a center line of said wing structure, said curve of said leading edge being defined by a function y=a sin x, where $-\pi/2 \leq x \leq \pi/2$ in radians, a being a real number defining an amplitude of said curve of said leading edge.

17. The wing configuration according to claim 16, wherein said curve of said leading edge starts from the fuselage substantially colinear with a sidewall of the fuselage, curves along said concave segment, and merges into said convex segment leading to said free end.

18. The wing configuration according to claim 16, wherein said trailing edge of said wing structure follows a curve having a concave segment and an adjoining convex segment.

19. The wing configuration according to claim 16, wherein said trailing edge follows a curve substantially corresponding with the curve followed by said leading edge.

20. In a fixed-wing aircraft having a fuselage with a longitudinal axis, a wing configuration attached to the fuselage, comprising:

a wing structure attached to the fuselage and projecting sideways away from the fuselage;

said wing structure having a leading edge defined by a forward traveling direction of the aircraft, a trailing edge, and a free end distally from the fuselage, said leading edge and said trailing edge of said wing structure each following a curve having a concave segment and an adjoining convex segment substantially defined by a tangent function.

21. In a fixed-wing aircraft having a fuselage with a longitudinal axis, a wing configuration attached to the fuselage, comprising:

a wing structure attached to the fuselage and projecting sideways away from the fuselage;

said wing structure having a leading edge defined by a forward traveling direction of the aircraft, a trailing edge, and a free end distally from the fuselage, said leading edge of said wing structure following a curve having a concave segment and an adjoining convex segment, and said trailing edge following a curve substantially corresponding with the curve followed by said leading edge.

\* \* \* \* \*

UNITED STATES PATENT AND TRADEMARK OFFICE
CERTIFICATE OF CORRECTION

PATENT NO. : 6,749,401 B2
DATED : June 15, 2004
INVENTOR(S) : Arthur Vanmoor

It is certified that error appears in the above-identified patent and that said Letters Patent is hereby corrected as shown below:

<u>Title page,</u>
Item [30], should read as follows:

-- Jul. 22, 2002       (NL)    ………….. 1021123 --

Signed and Sealed this

Twenty-seventh Day of July, 2004

JON W. DUDAS
*Acting Director of the United States Patent and Trademark Office*